United States Patent
Winker et al.

(10) Patent No.: US 9,052,159 B2
(45) Date of Patent: Jun. 9, 2015

(54) SYSTEM FOR DETERMINING THE SPATIAL ORIENTATION OF A MOVABLE APPARATUS

(71) Applicants: Bruce K. Winker, Ventura, CA (US); Jian Ma, San Diego, CA (US)

(72) Inventors: Bruce K. Winker, Ventura, CA (US); Jian Ma, San Diego, CA (US)

(73) Assignee: Teledyne Scientific & Imaging, LLC, Thousand Oaks, CA (US)

( * ) Notice: Subject to any disclaimer, the term of this patent is extended or adjusted under 35 U.S.C. 154(b) by 276 days.

(21) Appl. No.: 13/663,310

(22) Filed: Oct. 29, 2012

(65) Prior Publication Data

US 2014/0118723 A1    May 1, 2014

(51) Int. Cl.
   *G01N 21/00* (2006.01)
   *F41G 3/02* (2006.01)
   *G01B 11/26* (2006.01)
   *F41G 3/14* (2006.01)
   *G01S 5/16* (2006.01)

(52) U.S. Cl.
   CPC *F41G 3/02* (2013.01); *G01B 11/26* (2013.01); *F41G 3/14* (2013.01); *G01S 5/163* (2013.01)

(58) Field of Classification Search
   CPC ... H01J 37/32935; G01N 21/64; G01N 21/68; G01N 2015/1037; G01J 3/02
   USPC .......................................................... 356/72
   See application file for complete search history.

(56) References Cited

U.S. PATENT DOCUMENTS

| | | | |
|---|---|---|---|
| 4,356,758 A | 11/1982 | Teiling | 89/41 E |
| 4,365,149 A | 12/1982 | Falbel | 235/404 |
| 5,481,957 A | 1/1996 | Paley et al. | 89/41.19 |
| 5,686,690 A | 11/1997 | Lougheed et al. | 89/41.17 |
| 6,388,755 B1 | 5/2002 | Zhao et al. | 356/614 |
| 7,637,198 B2 | 12/2009 | De Villiers et al. | 89/41.17 |
| 2006/0005447 A1* | 1/2006 | Lenner et al. | 42/111 |
| 2011/0079703 A1* | 4/2011 | Gunning et al. | 250/206.2 |

\* cited by examiner

*Primary Examiner* — Tarifur Chowdhury
*Assistant Examiner* — Md Rahman
(74) *Attorney, Agent, or Firm* — Koppel, Patrick, Heybl & Philpott

(57) ABSTRACT

A system for determining the spatial orientation of a movable apparatus includes at least one optical angle-of-arrival (OAOA) sensor array, each of which comprises multiple OAOA sensors arranged to provide a 360° field-of-view (FOV). At least one sensor array is mounted on and has a known spatial relationship to a movable apparatus, the spatial orientation of which is to be determined. Point sources are located at one or more stationary positions within the FOV of at least one of the mounted arrays. An initial-north-finding/ initial-vertical-finding (INF/INV) system determines the spatial orientation of at least one of the point sources. Processing circuitry coupled to the INF/INV system and the sensor arrays derives the spatial orientation of the mounted arrays— and thereby the spatial orientation of the apparatus—based on the angular positions of the stationary point sources detected by the mounted arrays.

22 Claims, 2 Drawing Sheets

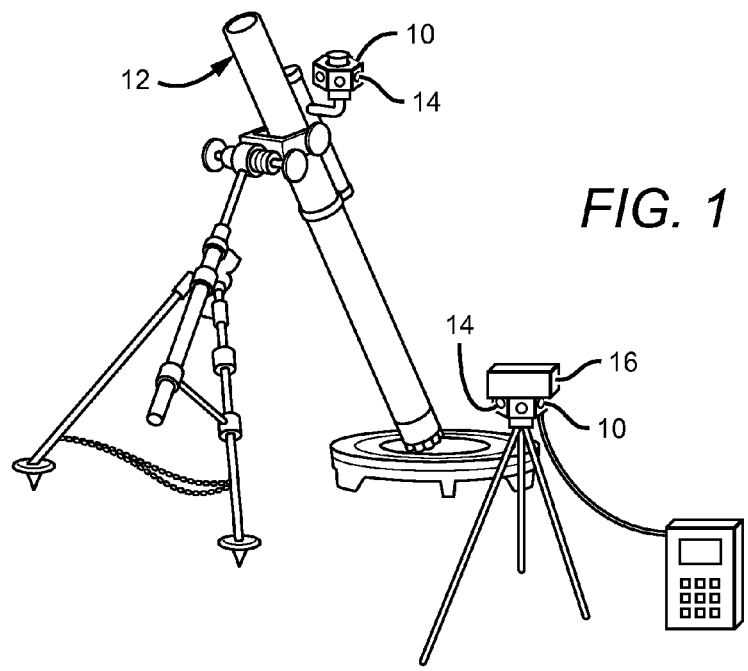
FIG. 1
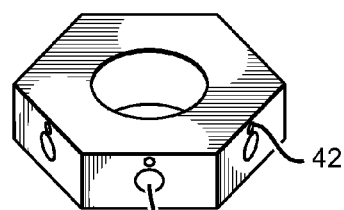
FIG. 3
FIG. 2a
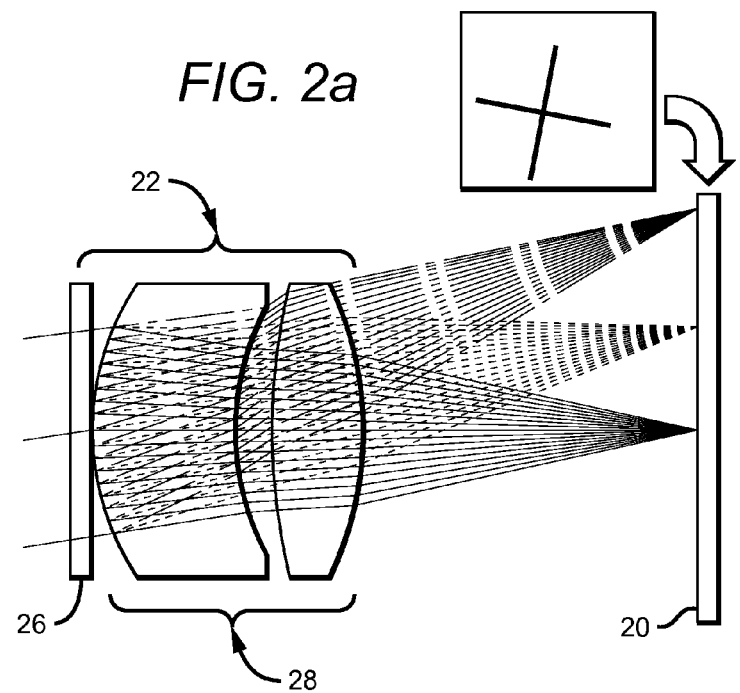

SYSTEM FOR DETERMINING THE SPATIAL ORIENTATION OF A MOVABLE APPARATUS

GOVERNMENT LICENSE RIGHTS

This invention was made with Government support under contract number N00164-08-C-1527 awarded by the Department of Defense. The Government has certain rights in this invention.

BACKGROUND OF THE INVENTION

1. Field of the Invention

This invention relates generally to systems for determining the spatial orientation (i.e., the azimuth and elevation) of a movable apparatus.

2. Description of the Related Art

There are many circumstances in which it is useful or necessary to determine the spatial orientation—i.e., the azimuth and elevation—of a movable apparatus. For example, in order to establish or determine particular property lines or boundaries, it is essential to know the spatial orientation of the equipment used in a surveying application. Similarly, for weaponry such as a mortar which must be aimed, it is vital to know the spatial orientation of the weapon prior to its being fired.

Numerous devices and systems have been employed to establish spatial orientation. For example, a digital magnetic compass can be used; however, such a compass can be susceptible to magnetic interference, and its azimuth accuracy is typically limited to about 9 mils (RMS). A high performance gyrocompass could be employed, though this device may be unacceptably bulky and expensive. A compact gyrocompass or inertial measurement unit (IMU) might also be used, though these devices tend to drift, which can limit their operation time. A differential global positioning system (DGPS) is another possible approach. However, this method may be limited by the availability of the GPS signal and the need for a long baseline. Furthermore, use of these methods is difficult when the measurement device must be attached to a weapon such as a mortar because of the high shock environment during weapon firing, and the need for a compact lightweight device.

SUMMARY OF THE INVENTION

A system for determining the spatial orientation of a movable apparatus is presented which overcomes the problems noted above, providing high precision and long-term stability using compact and lightweight equipment.

The present system includes at least one optical angle-of-arrival (OAOA) sensor array, each of which comprises a plurality of OAOA sensors arranged to provide a 360° field-of-view (FOV). Each OAOA sensor is preferably made from a focal plane array (FPA) image sensor comprising an M row×N column array of pixels, the rows and said columns being parallel to a row axis and a column axis, respectively, and one or more optical elements arranged to converge incoming light from one or more point sources onto the FPA in a predetermined pattern of lines which are oblique with respect to the row and column axes of the FPA, such that the position of the lines on the FPA varies with the angular position of the point source(s) relative to the sensor. At least one OAOA sensor array is mounted on and has a known spatial relationship to a movable apparatus, the spatial orientation of which is to be determined.

The present system also requires one or more point sources mounted at one or more stationary positions, each of which is within the FOV of at least one of the OAOA sensor arrays mounted to the apparatus. An initial-north-finding/initial-vertical-finding (INF/INV) system is provided to determine the azimuth and elevation of at least one of the point sources. With the INF/INV data known, processing circuitry coupled to the OAOA sensor arrays is arranged to derive the azimuth and elevation of the arrays mounted to the movable apparatus—and thereby the spatial orientation of the apparatus—based on the angular positions of the stationary point sources detected by the arrays.

A preferred system also includes one or more point sources mounted to the movable apparatus and which have a known spatial relationship to at least one of the mounted arrays. In addition, at least one OAOA sensor array is mounted at one of the stationary positions in a known spatial relationship to the point sources at the stationary position, with the point sources mounted to the movable apparatus being within the FOV of at least one of the arrays mounted at one of the stationary positions. When so arranged, processing circuitry coupled to the OAOA sensor arrays derives the azimuth and elevation of the arrays mounted to the movable apparatus based on the angular positions of the stationary point sources detected by the arrays mounted to the apparatus, and on the angular positions of the point sources mounted to the apparatus detected by the stationary arrays.

These and other features, aspects, and advantages of the present invention will become better understood with reference to the following description and claims.

BRIEF DESCRIPTION OF THE DRAWINGS

FIG. 1 is a diagram illustrating the basic elements of a system for determining the spatial orientation of a movable apparatus per the present invention.

FIGS. 2a and 2b illustrate the structure and operation of one possible embodiment of an OAOA sensor as might be used with a system for determining the spatial orientation of a movable apparatus per the present invention.

FIG. 3 is a diagram of one possible embodiment of an OAOA sensor array, in which the individual OAOA sensors are formed into a hexagonal pattern.

DETAILED DESCRIPTION OF THE INVENTION

Figure 2B:
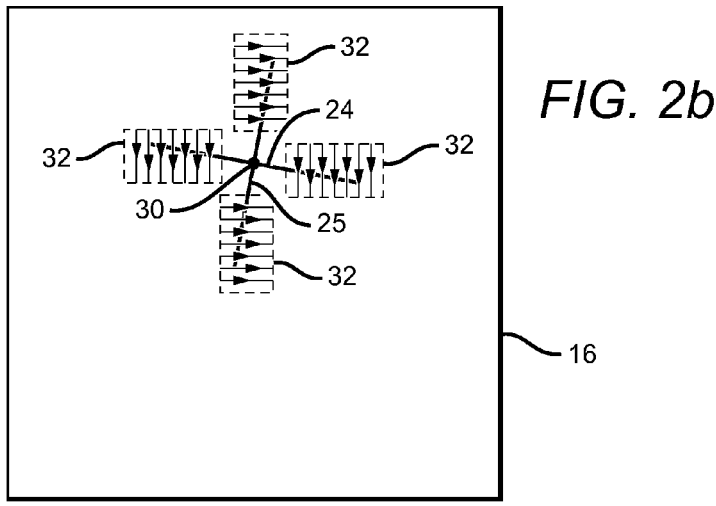

FIG. 1 illustrates the basic principles of a system for determining the spatial orientation of a movable apparatus per the present invention. The system includes one or more optical angle-of-arrival (OAOA) sensor arrays 10, at least one of which is mounted and has a known spatial relationship to a movable apparatus 12, the spatial orientation of which is to be determined. The apparatus may be, for example, a surveying device, a laser rangefinder, or, as illustrated in FIG. 1, a weapon such as a mortar or artillery. To be properly positioned or aimed, it is vital to be able to determine the spatial orientation of the apparatus with respect to a fixed and known physical location.

The present system also includes one or more point sources 14, such as a laser, light-emitting diode (LED) or LED beacon transmitter, mounted at one or more stationary positions, each of which is within the FOV of at least one of the OAOA sensor arrays mounted to the movable apparatus. An initial-north-finding/initial-vertical-finding (INF/INV) system 16 is employed for determining the azimuth and elevation of at least one of the stationary point sources.

With at least one point source in the FOV of OAOA sensor array 10 having a known spatial orientation, the spatial orientation of array 10—and thus the spatial orientation of the apparatus itself—can be determined. This is accomplished with processing circuitry (not shown) coupled to the OAOA sensor arrays and arranged to derive the azimuth and elevation of the arrays mounted to the movable apparatus (and thereby the spatial orientation of the apparatus) based on the angular positions of the stationary point sources detected by the arrays. The movable apparatus can then be moved and its spatial orientation re-established, so long as at least one point source having a known orientation remains within its FOV. Reference to the orientation of the stationary point source preferably occurs automatically, requiring only momentary line-of-sight access each time the apparatus is moved.

Each OAOA sensor array is made from a plurality of OAOA sensors, and is preferably arranged to provide a 360° field-of-view (FOV). The structure and operation of a preferred OAOA sensor are illustrated in FIGS. 2a and 2b. The sensor comprises a focal plane array (FPA) 20 comprising an M row×N column array of pixels, with the rows and columns being parallel to a row axis and a column axis, respectively, and one or more optical elements 22 arranged to converge incoming light produced by a collimated beam such as a laser beam, or a point light source such as a light-emitting diode (LED) onto FPA 20 in a predetermined pattern of lines 24, 25 which are oblique with respect to the row and column axes of the FPA, such that the position of the lines on the FPA varies with the angular position of the point source(s) relative to the sensor; a suitable OAOA sensor of this sort is described in co-pending patent application Ser. No. 12/401,027, which also describes many alternative sensor embodiments that would also be suitable for use with the present system. As explained there, optical elements 22 preferably include a diffractive optical element (DOE) 26 and a lens or a group of lenses 28. The DOE preferably forms one or more pairs of lines 24, 25 which make up a cross-pattern which is tilted with respect to the FPA's row and column axes. The lens elements 28 focus the cross-patterns on FPA 20 as sharp lines, each of which traverses at least two rows or columns (preferably three rows or columns) along its length.

For an OAOA sensor as described above, the optical angle-of-arrival is calculated in accordance with $\theta x = A(x) \cdot \tan^{-1}(x/f)$, and $\theta y = B(y) \cdot \tan^{-1}(y/f)$, where f is the focal length of the optical elements, x and y are coordinates based on the position of the imaged lines on the FPA, and $A(x)$ and $B(y)$ are parameters that account for optical distortion and other imperfections of the system. A means for interpolating the position of the line or lines on the FPA is preferably used to provide the x, y coordinates. One way in which these coordinates can be determined is shown in FIG. 2b. The optical elements are preferably arranged such that the center point 30 of each crosshair pattern is at least twice as bright as the perpendicular narrow width lines which form the arms of the crosshair pattern. The positions on the FPA of each crosshair pattern are then interpolated by:

selecting a center point on the FPA, the location of which is to be determined;

defining at least two regions 32 on the FPA around the selected center point, each of which includes at least a portion of a respective one of the arms of the crosshair pattern associated which the selected center point;

for each of the regions, determining the coordinates of the point of peak intensity in each row or each column within the region. This is preferably accomplished by scanning across the width of a region for each row that intersects that region (for regions located primarily above or below center point 30), or scanning across the height of the region for each column that intersects that region (for regions located primarily to the left or right of center point 30), with each scan identifying a point of peak intensity; and curve-fitting the peak points to define each arm of the crosshair pattern.

The location of the center of each crosshair pattern is determined by calculating the point of intersection of the crosshair pattern's arms as defined via the curve-fitting. Additional details of an interpolation method of this sort are described in co-pending patent application Ser. No. 12/971,357.

In a preferred method, the first step in the curve fitting procedure to determine the exact locus of the crosshair pattern is to locate it approximately. This provides a starting point in the search for the crosshair arms and is most easily accomplished if the brightest pixel in the captured image is at the intersection. This can be guaranteed by specifying that the DOE zero order spot energy be above some minimum value. A DOE with 100% diffraction efficiency into the crosshair arms would actually be sub-optimal for this application because it has no central bright spot. The zero order intensity should be greater than twice the brightness of the crosshair arms so that it can be easily distinguished. At the other extreme, it is undesirable to have the intersection saturate the detector when the arms are comfortably in mid-dynamic range, so it is best if the zero order intensity not exceed about eight times the average intensity in the crosshair arms.

Once the approximate center is identified, the true intersection may be located to subpixel resolution by curve fitting lines to the crosshair arms, which extend vertically and horizontally from the bright spot. For the vertical arm, the points on the line can be identified by considering the pixels in each row about the horizontal location of the approximate intersection and selecting the brightest one. Alternatively, the points on this line can be located to subpixel accuracy by applying a first moment algorithm ("center of brightness"). An identical procedure in the other dimension identifies the points constituting the horizontal crosshair member. Best fit lines are calculated for these two sets of points and their intersection fixes the crosshair intersection with high accuracy.

This procedure works well at the center of the FPA's field of view, but at large angles optical distortion can make one or both of the crosshair arms appear curved on the focal plane. In this case, the linear fit described above does not correctly locate the intersection of the crosshair arms. The problem may be resolved by performing a least squares parabolic fit including a nonlinear term. This models the curvature of the arms, which enables their intersection to be found with high accuracy.

A preferred embodiment of the present system, which enables the elevation of the arrays mounted to the movable apparatus to be accurately determined, includes one or more point sources mounted to the movable apparatus and having a known spatial relationship to at least one of the OAOA sensor arrays on the apparatus, and at least one OAOA sensor array mounted at one of the stationary positions and in a known spatial relationship to the point sources at the stationary position, as is illustrated in FIG. 1. The system is arranged such that the point sources mounted to the movable apparatus are within the FOV of at least one of the OAOA sensor arrays mounted at one of the stationary positions; the determination of the angle-of-arrival of light from a point source on the apparatus by a stationary OAOA sensor array enables the elevation of the arrays mounted to the movable apparatus to be determined. When so arranged, the movable apparatus can be rotated in any direction and pitched in any elevation or even moved small distances, and its spatial orientation can be re-established—so long as at least one point source have a known orientation is within the FOV of an OAOA sensor array mounted to the movable apparatus, and at least one point source mounted to the apparatus is within the FOV of a stationary OAOA sensor array.

An INF/INV system establishes the initial orientation of at least one stationary point source or stationary array (since at least one OAOA sensor array has a known spatial relationship to at least one stationary point source). With this initial orientation known, processing circuitry coupled to the OAOA sensor arrays is arranged to derive the azimuth and elevation of the OAOA sensor arrays mounted to the movable apparatus based on the INF/INV data, the angular positions of the point sources on the stationary arrays that are detected by the OAOA sensor arrays mounted to the apparatus, and on the angular positions of the point sources on the apparatus that are detected by the stationary OAOA sensor arrays.

The system's 'processing circuitry' is preferably (though not necessarily) located on or coupled to the movable apparatus, with the INF/INV data, as well as data acquired by the stationary OAOA sensor arrays, preferably coupled to the processing circuitry via optical or wireless means. Data acquired by the OAOA sensor arrays mounted to the movable apparatus might also be coupled to the processing circuitry via optical or wireless means.

As noted above, each OAOA sensor array is preferably made from a plurality of OAOA sensors which are preferably arranged to provide a 360° FOV. This will require multiple OAOA sensors; a preferred arrangement is shown in FIG. 3, in which an array is formed using six OAOA sensors arranged in a hexagonal pattern. For the OAOA sensor array shown, each face of the hexagon includes the optical elements (DOE/lens) 40 of the OAOA sensor; the sensor's FPA and associated electronics would typically be mounted behind each face. A point source 42 is also preferably included on each face, in a known spatial relationship to that face's OAOA sensor; multiple point sources mounted to the respective faces of the array provide illumination for absolute angle measurement.

As noted above, the spatial relationship between the point source and the OAOA sensor on a given face is known. A calibration process is typically necessitated to achieve this. One possible calibration process requires the use of two precise rotation stages that are more accurate than the OAOA sensors themselves. The OAOA sensor is mounted on rotation stages that control azimuth and elevation angles, and the FPAs on the OAOA sensor are used to measure the angle-of-arrival of multiple LEDs positioned on an LED calibration plate. This data is least squares fitted to determine the relative positions of the FPAs. Then, another already calibrated sensor is used to measure the point sources on the OAOA sensor, and this data is least squares fitted to get the point source locations relative to the OAOA sensor.

Figure 4:
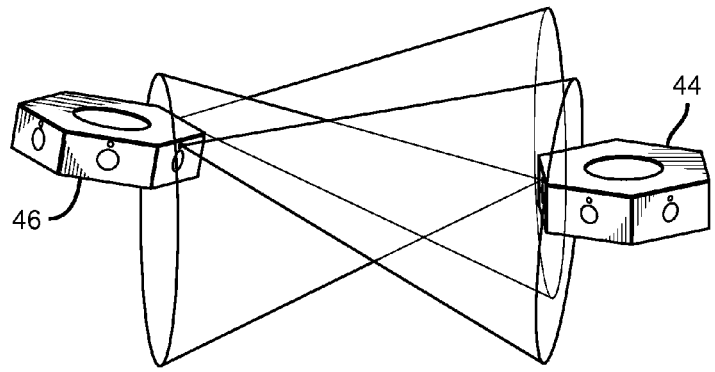
FIG. 4 is a diagram illustrating the use of stationary and movable OAOA sensor arrays as might be used with a system for determining the spatial orientation of a movable apparatus per the present invention.

FIG. 4 illustrates the operation of two OAOA sensor arrays as shown in FIG. 3: a stationary OAOA sensor array 44 and an OAOA sensor array 46 mounted to the movable apparatus. At least one of the OAOA sensors of array 44 determines the angle-of-arrival of incoming light sourced by a point source on array 46, and at least one of the OAOA sensors of array 46 determines the angle-of-arrival of incoming light sourced by a point source on array 44.

The INF/INV system used to establish the initial orientation of one or more of the stationary point sources or stationary arrays can be, for example, a global positioning system (GPS) or differential GPS system (DGPS), an inertial measurement unit (IMU), a digital magnetic compass and/or a gyrocompass. Once the initial orientation has been established, the INF/INV system is no longer needed and can be removed.

Figure 5:
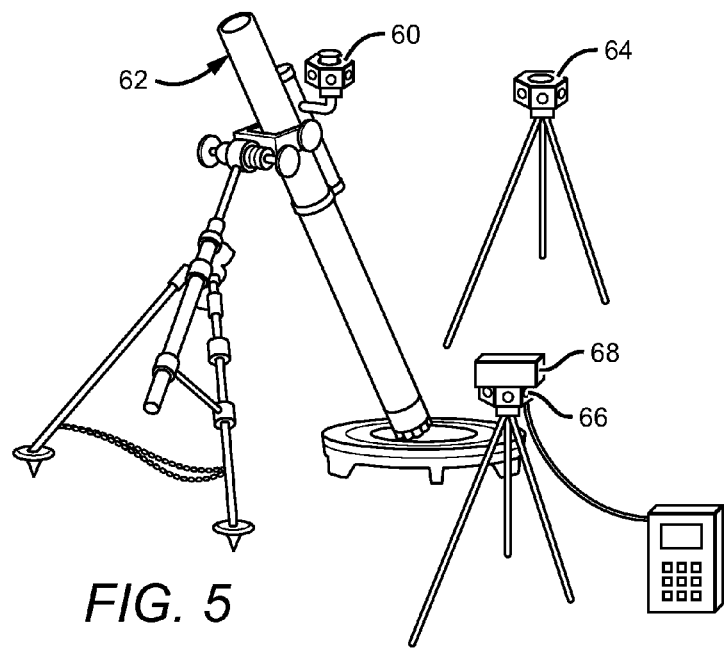
FIG. 5 is a diagram illustrating a preferred embodiment of a system for determining the spatial orientation of a movable apparatus per the present invention.

A preferred embodiment of the present system is shown in FIG. 5. A first OAOA sensor array 60 is mounted to a movable apparatus 62 (here, a mortar), and a second OAOA sensor array 64 is mounted at a stationary location. The system may also include one or more additional stationary locations, each of which includes at least one point source and preferably at least one OAOA sensor array, to ensure that an OAOA sensor array on the movable apparatus always has at least one stationary point source in its FOV; one such additional stationary location which includes an OAOA sensor array 66 is shown in FIG. 5. When there are multiple stationary arrays, the initial orientation via INF/INV system (68, shown mounted to array 66 in this example) need only be established for one of the stationary arrays; the remaining stationary arrays can then be 'calibrated'—i.e., have their spatial orientations determined—by detecting the angle-of-arrival of a point source located on the stationary array whose orientation is known.

Sensor arrays 64 and 66 each include at least one point source which is within the FOV of OAOA sensor array 60 INF/INV system 68 and stationary array 66 are co-mounted on a tripod, with the INF/INV system having a known spatial relationship to stationary array 66. As sensor array 66 has a known spatial relationship to INF/INV system 68, this establishes the spatial orientation of array 66. This data is relayed to the system's processing circuitry (not shown), which is also coupled to OAOA sensor array 60 mounted to the mortar. The processing circuitry is then arranged to derive the azimuth and elevation of OAOA sensor array 60 based on the INF/INV data, the angular positions of the point sources on stationary arrays 64 and 66 detected by array 60, and on the angular positions of the point sources on array 60 detected by stationary arrays 64 and 66.

The point sources associated with a particular OAOA sensor array are preferably activated one at a time, rather than simultaneously, so that only one cross-pattern at a time is formed on the OAOA sensors which detect the light from the point sources. Various means of activating and/or encoding the point sources so that they can be identified are described, for example, in co-pending patent application Ser. No. 12/648,709.

The present system is preferably arranged such that, should one or more OAOA sensor arrays at stationary positions be accidently moved, the system will automatically recalibrate itself such that the new spatial orientation(s) of the stationary arrays is re-established. It is preferable that an INF/INV system be permanently available when offering this capability, so that the orientation of at least one of the stationary arrays can always be determined.

The present system combines compact, lightweight and low-cost OAOA sensors with a conventional direction finding system (INF/INV) to achieve high precision spatial orientation determination with long-term stability. A system as described herein is immune to magnetic interference, can achieve better accuracy than is possible with conventional devices such as a digital magnetic compass, and does not require the availability of the GPS signal.

The computations needed to determine spatial orientation based on data from two or more OAOA sensor arrays are well-known. One possible approach is now described. Assume that there are OAOA sensors $S_1^1, S_2^1, \ldots, S_n^1$ and point source LEDs $L_1^1, L_2^1, \ldots, L_n^1$ in coordinate system $C^1$, and OAOA sensors $S_1^2, S_2^2, \ldots, S_n^2$ and LEDs $L_1^2, L_2^2, \ldots, L_n^2$ in coordinate system $C^2$. Within each coordinate system, each sensor is characterized by its location and orientation (x, y, z, $\phi$, $\theta$, $\phi$), and each LED is characterized by its location only (x, y, z). All of these values can be obtained during the fabrication process of the OAOA sensor array.

When two OAOA sensor arrays are deployed, the relative orientation of one array relative to the other array is to be determined; i.e., the coordinate transformation from $C^2$ to $C^1$. This transformation can be described by a translation T and a rotation R. In terms of T and R, coordinates in $C^2$ can be written in $C^1$ as:

$$X^1 = R(X^2 - T)$$

and rotation matrices in $C^2$ can be written in $C^1$ as:

$$M^1 = RM^2.$$

In matrix representation, X and T can be written as a 1×3 vector, and M and R can be written as 3×3 matrices.

The determination of spatial orientation is preferably accomplished by flashing the point sources one by one, with the OAOA sensors capturing each flash as a cross-pattern from which the angle-of-arrival of the light can be calculated. In the coordinate system of sensor $S_j$, the angle-of-arrival of LED $L_i$ is measured as:

$$\tan\theta_x = \frac{x_i}{z_i}$$

$$\tan\theta_y = \frac{y_i}{z_i}$$

The coordinate translation from the individual OAOA sensors to their OAOA sensor array is similar to the $X^1$ and $M^1$ equations shown discussed above:

$$X^c = R^s(x^s - T^s)$$

$$M^c = R^s M^s$$

Once the angles-of-arrival of enough point sources are measured, the above equations can be solved to find rotation matrix R, which gives the relative orientation of the two OAOA sensor arrays. In non-trivial cases, at least four angle-of-arrival measurements are needed, though more measurements may be made to get redundant data. This mathematical approach is associated with Kalman filters; since the tan $\theta_x$, tan $\theta_y$ equations are not linear, a non-linear Kalman filter is used.

The embodiments of the invention described herein are exemplary and numerous modifications, variations and rearrangements can be readily envisioned to achieve substantially equivalent results, all of which are intended to be embraced within the spirit and scope of the invention as defined in the appended claims.

We claim:

1. A system for determining the spatial orientation of a movable apparatus, comprising:
    at least one optical angle-of-arrival (OAOA) sensor array, each of said arrays comprising a plurality of OAOA sensors arranged to provide a 360° field-of-view (FOV), each of said sensors arranged to receive incoming light from one or more point sources and to determine the angular position of said point source(s) relative to said sensor,
    at least one of said OAOA sensor arrays mounted to and having a known spatial relationship to a movable apparatus;
    one or more point sources mounted at one or more stationary positions, each of which is within the FOV of at least one of said arrays mounted to said movable apparatus;
    an initial-north-finding/initial-vertical-finding (INF/INV) system for determining the azimuth and elevation of at least one of said point sources; and
    processing circuitry coupled to said INF/INV system and said OAOA sensor arrays and arranged to derive the azimuth and elevation of the OAOA sensor arrays mounted to said movable apparatus and thereby the spatial orientation of said apparatus based on the angular positions of said stationary point sources detected by said OAOA sensor arrays.

2. The system of claim 1, further comprising one or more point sources mounted to said movable apparatus and having a known spatial relationship to at least one of said arrays on said apparatus,
    wherein at least one of said OAOA sensor arrays is mounted at one of said stationary positions in a known spatial relationship to the point sources at said stationary position, the point sources mounted to said movable apparatus being within the FOV of at least one of said arrays mounted at one of said stationary positions, said processing circuitry coupled to said INF/INV system and said OAOA sensor arrays and arranged to derive the azimuth and elevation of the arrays mounted to said movable apparatus based on the angular positions of said stationary point sources detected by said arrays mounted to said apparatus and on the angular positions of said point sources mounted to said apparatus detected by said stationary arrays.

3. A system for determining the spatial orientation of a movable apparatus, comprising:
    at least one optical angle-of-arrival (OAOA) sensor array, each of said arrays comprising a plurality of OAOA sensors arranged to provide a 360° field-of-view (FOV), each of said sensors arranged to receive incoming light from one or more point sources and to determine the angular position of said point source(s) relative to said sensor,
    at least one of said OAOA sensor arrays mounted to and having a known spatial relationship to a movable apparatus;
    one or more point sources mounted at one or more stationary positions, each of which is within the FOV of at least one of said arrays mounted to said movable apparatus;
    an initial-north-finding/initial-vertical-finding (INF/INV) system for determining the azimuth and elevation of at least one of said point sources; and
    processing circuitry coupled to said INF/INV system and said OAOA sensor arrays and arranged to derive the azimuth and elevation of the OAOA sensor arrays mounted to said movable apparatus and thereby the spatial orientation of said apparatus based on the angular positions of said stationary point sources detected by said OAOA sensor arrays;
    wherein each of said sensors comprises:
        a focal plane array (FPA) image sensor comprising an M row x N column array of pixels, said rows and said columns being parallel to a row axis and a column axis, respectively; and one or more optical elements arranged to converge incoming light from one or more point sources onto said FPA in a predetermined pattern of lines which are oblique with respect to the row and column axes of said FPA, such that the position of said lines on said FPA varies with the angular position of said point source(s) relative to said sensor.

4. A system for determining the spatial orientation of a movable apparatus, comprising:
   a plurality of optical angle-of-arrival (OAOA) sensor arrays, each of said arrays comprising:
      a plurality of OAOA sensors arranged to provide a 360° field-of-view (FOV), each of said sensors comprising:
         a focal plane array (FPA) image sensor comprising an M row×N column array of pixels, said rows and said columns being parallel to a row axis and a column axis, respectively; and
         one or more optical elements arranged to converge incoming light from one or more point sources onto said FPA in a predetermined pattern of lines which are oblique with respect to the row and column axes of said FPA, such that the position of said lines on said FPA varies with the angular position of said point source(s) relative to said sensor; and
      one or more point sources, each of which is in a known spatial relationship to one of said sensors on said array;
   at least one of said OAOA sensor arrays mounted to a movable apparatus and at least one of said OAOA sensor arrays mounted at a stationary position, said arrays mounted to said apparatus being within the FOV of at least one of said stationary arrays and said stationary arrays being within the FOV of at least one of said arrays mounted to said apparatus;
   an initial-north-finding/initial-vertical-finding (INF/INV) system for determining the azimuth and elevation of at least one of said stationary arrays; and
   processing circuitry coupled to said INF/INV system and said OAOA sensor arrays and arranged to derive the azimuth and elevation of the arrays mounted to said movable apparatus based on the angular positions of the point sources on said stationary arrays which are detected by said arrays mounted to said movable apparatus, and by the angular positions of the point sources on said arrays mounted to said movable apparatus which are detected by said stationary arrays.

5. The system of claim 4, wherein each of said point sources is a light-emitting diode (LED) or a laser.

6. The system of claim 4, wherein each of said OAOA sensor arrays comprises six OAOA sensors arranged in a hexagonal pattern.

7. The system of claim 4, wherein said INF/INV system comprises a differential global positioning system (DGPS), an inertial measurement unit (IMU), a digital magnetic compass and/or a gyrocompass.

8. The system of claim 4, wherein said movable apparatus is a mortar.

9. The system of claim 4, wherein said movable apparatus is artillery.

10. The system of claim 4, wherein said predetermined light pattern comprises two perpendicular narrow width lines that form a cross-pattern, each of said lines being oblique with respect to said row and column axes and traversing at least two of said rows or columns along their respective lengths.

11. The system of claim 10, further comprising a means for interpolating the positions of said narrow width lines on said FPA.

12. The system of claim 11, wherein said means for interpolating comprises identifying the pixels making up said cross-pattern and curve-fitting said pixels to determine the true point of intersection point of said narrow-width lines.

13. The system of claim 12, wherein said cross-pattern comprises a vertical arm and a horizontal arm which extend vertically and horizontally from said point of intersection, wherein identifying the pixels making up said vertical arm comprises considering the pixels in each row about the horizontal location of the point of intersection and selecting the brightest one, and identifying the pixels making up said horizontal arm comprises considering the pixels in each row about the vertical location of the point of intersection and selecting the brightest one.

14. The system of claim 12, wherein identifying the pixels making up said cross-pattern comprises applying a first moment algorithm.

15. The system of claim 12, wherein said curve-fitting comprises performing a least squares parabolic fit including a nonlinear term.

16. The system of claim 4, wherein said optical elements include a diffractive optical element (DOE) and one or more lenses located between said DOE and said FPA.

17. The system of claim 16, wherein the zero order spot energy of said DOE is above a predetermined minimum value.

18. The system of claim 17, wherein said predetermined light pattern comprises two perpendicular narrow width lines that form the arms of a cross-pattern, and said zero order spot energy is greater than twice the brightness of said cross-pattern arms.

19. The system of claim 4, wherein said processing circuitry is coupled to at least one of said OAOA sensor arrays via optical or wireless means.

20. The system of claim 4, wherein at least two of said OAOA sensor arrays are mounted at respective stationary positions.

21. The system of claim 20, wherein said INF/INV system is arranged to determine the azimuth and elevation of one of said stationary arrays such that said array has a known spatial orientation, and the remaining stationary arrays are arranged to determine their spatial orientations based on their positions relative to said stationary array having a known spatial orientation.

22. The system of claim 21, wherein each of said stationary arrays is arranged to automatically re-determine its spatial orientation relative to said stationary array having a known spatial orientation if moved with respect to said stationary array having a known spatial orientation.

* * * * *